United States Patent
Kundu et al.

(10) Patent No.: US 7,406,486 B1
(45) Date of Patent: Jul. 29, 2008

(54) TRANSFORMING TRANSACTIONS TO INCREASE PARALLELISM WHEN REPLICATING

(75) Inventors: Joydip Kundu, Nashua, NH (US); Mahesh Girkar, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 514 days.

(21) Appl. No.: 10/120,634

(22) Filed: Apr. 10, 2002

(51) Int. Cl.
*G06F 17/30* (2006.01)

(52) U.S. Cl. .......................... 707/201; 707/8
(58) Field of Classification Search ................ 707/200, 707/201, 8, 10, 203, 202, 204, 103 X, 103 Y, 707/103 Z, 103 R, 2; 709/201, 248; 714/1, 714/2; 711/154, 161, 162
See application file for complete search history.

(56) References Cited

U.S. PATENT DOCUMENTS

| | | | |
|---|---|---|---|
| 5,170,480 A | | 12/1992 | Mohan et al. |
| 5,530,855 A | | 6/1996 | Satoh et al. |
| 5,734,897 A | * | 3/1998 | Banks .......................... 707/202 |
| 5,806,075 A | * | 9/1998 | Jain et al. ..................... 707/201 |
| 5,864,851 A | * | 1/1999 | Breitbart et al. ................ 707/8 |
| 5,940,839 A | * | 8/1999 | Chen et al. ................... 707/202 |
| 5,950,212 A | * | 9/1999 | Anderson et al. ............. 707/205 |
| 6,163,855 A | * | 12/2000 | Shrivastava et al. ............. 714/4 |
| 6,205,449 B1 | | 3/2001 | Rastogi et al. |
| 6,289,357 B1 | | 9/2001 | Parker |
| 6,304,882 B1 | * | 10/2001 | Strellis et al. ................ 707/202 |
| 6,449,734 B1 | * | 9/2002 | Shrivastava et al. ............ 714/15 |
| 6,526,416 B1 | * | 2/2003 | Long ............................ 707/202 |
| 6,647,510 B1 | | 11/2003 | Ganesh et al. |
| 6,823,355 B1 | * | 11/2004 | Novaes et al. ................ 709/201 |
| 6,823,356 B1 | * | 11/2004 | Novaes et al. ................ 709/201 |
| 6,980,988 B1 | | 12/2005 | Demers et al. |
| 2002/0109816 A1 | | 8/2002 | Ganesh et al. |

OTHER PUBLICATIONS

Ng et al., Replicated Transactions, Distributed Computing Transactions, 1989., IEEE, 9th International Conference on, 1989, pp. 474-480.*

* cited by examiner

*Primary Examiner*—Greta L. Robinson
(74) *Attorney, Agent, or Firm*—Hickman Palermo Truong & Becker LLP

(57) ABSTRACT

Techniques are provided for replicating data on computer systems, including database systems. The operations of a group of transactions are rearranged to be executed in another set of transactions. A transaction in the other set of transactions may be executed independently of the timing of the execution of any other transaction from the set, so long as the set is committed as a group.

22 Claims, 6 Drawing Sheets

GROUP OF SOURCE TRANSACTIONS 201

$T^1 = {}^1R_1 \quad {}^1R_2 \quad {}^1R_3 \quad {}^1R_4 \quad {}^1R_5 \quad {}^1R_6$ — FOURTH OPERATION 214

$T^2 = {}^2R_2 \quad {}^2R_7 \quad {}^2R_8 \quad {}^2R_9 \quad {}^2R_1$ — SECOND OPERATION 211

THIRD OPERATION 213        FIRST OPERATION 212

FIG. 2A

REFORMED GROUP OF OPERATION SETS 220

| $^1R_1$ | $^1R_2$ | $^1R_3$ | $^1R_4$ | $^1R_5$ | $^1R_6$ |
| $^2R_7$ | $^2R_2$ | $^2R_9$ |  |  |  |
| $^2R_1$ | $^2R_8$ |  |  |  |  |
| 221 | 222 | 223 | 224 | 225 | 226 |

THIRD OPERATION 213
FIRST OPERATION 211 — SECOND OPERATION 212
FOURTH OPERATION 214

FIG. 2B

TRANSFORMING TRANSACTIONS TO INCREASE PARALLELISM WHEN REPLICATING

FIELD OF THE INVENTION

The present invention relates to replicating data on computer systems, and in particular, replicating transactions in transaction-oriented database systems.

BACKGROUND OF THE INVENTION

The activities of enterprises are highly intertwined with computers. For many enterprises, computer system unavailability can be disabling. The ability to maintain availability is therefore an important capability of computer systems.

Computers systems used by enterprises store and retrieve large amounts of data. Typically, the computer systems rely on database systems to perform this function. Therefore, a database system's capability to maintain availability is very important.

Replication is one technique used to maintain the availability of database systems. Replication is the process of replicating data from a "primary" database system onto another database system, herein referred to as a standby. As changes are made to user data on the primary database system, the changes are replicated on the standby. If the primary database system becomes unavailable, the standby can be made primary.

One approach to replication is the physical standby approach. Under this approach, the changes made to data blocks on the primary database are made to replicas of those data blocks on a physical standby. Because the primary database system is replicated at the lowest atomic level of storage space on the standby, the physical standby is a physical replica of the primary database system.

Another approach to replicating data is the logical standby approach. Under the logical standby approach, database commands that modify data on the primary system are re-executed on a logical standby. While executing the same database commands guarantees that changes are replicated at the record level, the changes are not replicated at the data block level. This change in replication strategy allows a logical standby to be available for reporting applications while replication is being performed—an advantage over a physical standby.

Typically, changes to database systems are made using transaction processing. A transaction is a set of operations that change data. In database systems, the operations are specified by one or more database commands. Committing a transaction refers to making the changes for a transaction permanent.

Under transaction processing, all the changes for a transaction are made atomically. When a transaction is committed, either all changes are committed, or the transaction is rolled back. Because the changes are not permanent until a transaction is committed, the changes for a transaction are not replicated on a logical standby until the transaction is committed on the primary database. After a transaction is committed on the primary database system, the transactions are re-executed and committed on the logical standby.

To replicate data on a logical standby more quickly and efficiently, transactions are executed in parallel. Transactions may be executed in parallel by multiple processes, each process executing one of the transactions. The efficiency of the replication process may be improved by increasing the number of transactions executed in parallel.

Under conventional approaches, certain conditions can force transactions to be executed serially at a logical standby. For example, if a pair of transactions includes operations that modify the same records, then the transactions are not executed in parallel. Instead, the transactions in the pair are executed in serial, with the first transaction to be committed on the primary being executed first. The transactions are serialized under these conditions to ensure that operations to the same records are committed in the same order on the replicated system as they are on the primary database system.

Based on the foregoing, it is clearly desirable to develop an approach that allows operations in two or more transactions to be executed in parallel when the transactions modify the same records.

SUMMARY OF THE INVENTION

Techniques are provided for replicating data on computer systems, including database systems. The operations of a group of transactions are rearranged to be executed in another set of transactions. A transaction in the other set of transactions may be executed independently of the timing of the execution of any other transaction from the set, so long as the set is committed as a group. A transaction in a set of transactions is referred to as being able to be executed independently of when any other transaction from the set is executed, if either the transaction may be executed (1) in parallel with any of the transactions in the set or (2) in any order relative to another transaction in the set. By rearranging transactions in this way, the power of parallel execution may be further exploited to replicate transactions with greater efficiency.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a diagram depicting transactions used to illustrate an embodiment of the present invention;

FIG. 2B is a diagram depicting the reorganized operations of transactions;

DETAILED DESCRIPTION OF THE INVENTION

A method and apparatus for replicating data is described. In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Architectural Overview

Figure 1:
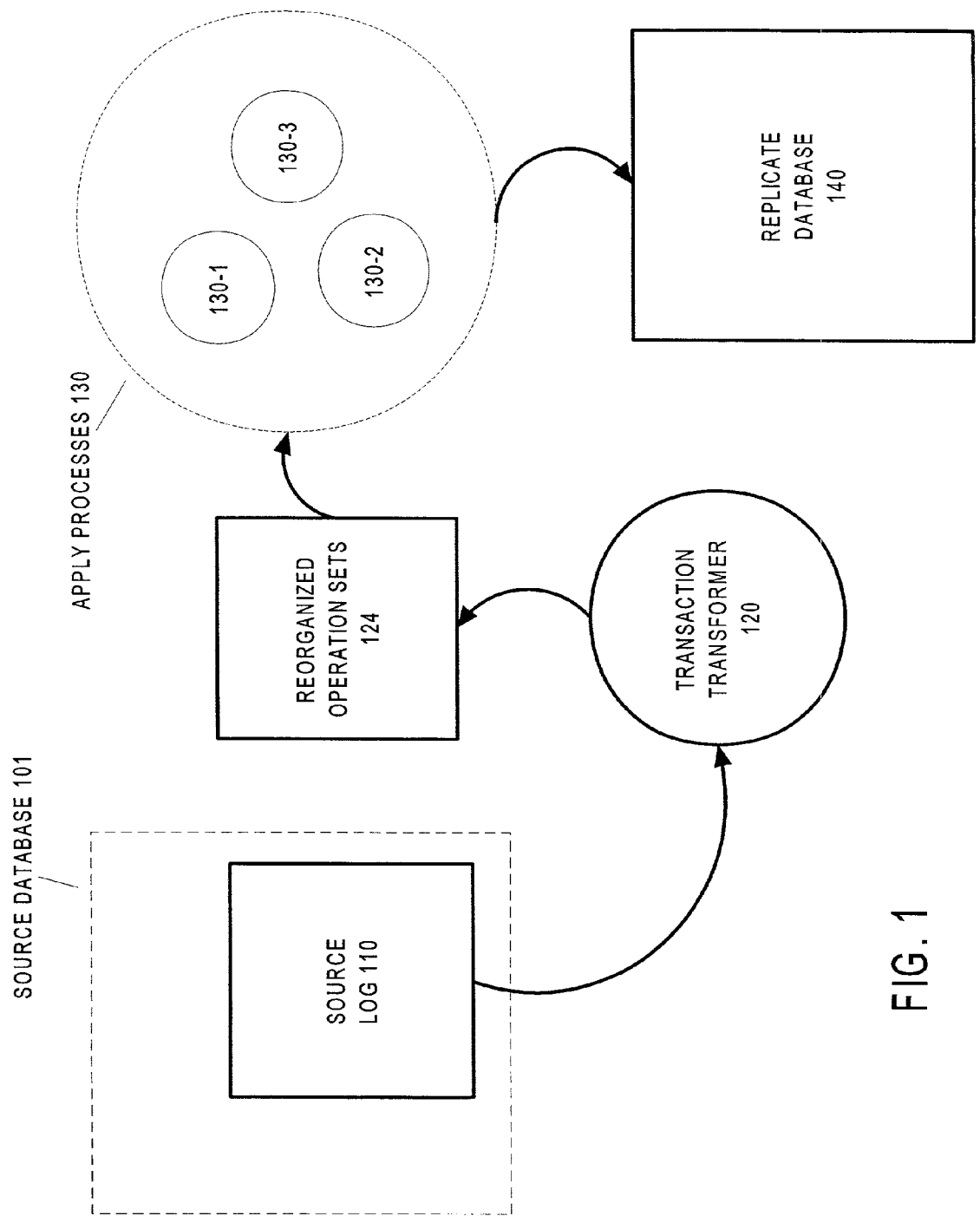
FIG. 1 is a block diagram depicting a system architecture which may be used to implement an embodiment of the present invention.

FIG. 1 is a block diagram depicting a system architecture which may be used to implement an embodiment of the present invention. Referring to FIG. 1, it depicts source database system 101 and replicate database system 140. "Source" transactions committed on source data system 101 are replicated on replicate database system 140. Source log 110 is data describing source transactions committed on source database system 101. The information in source log 110 should be sufficient to determine what operations are performed in a source transaction, the record(s) (e.g. row(s)) affected by an operation, and the order in which the source transactions were committed. For example, source log 110 may be a redo log maintained by a logging mechanism. Database systems use logging mechanisms to track operations (e.g. a delete, insert, and update of a row) that change user data in a database system so that the operations may be recovered in the event of a database system failure. Examples of information stored in a redo log include the identity of the transactions in which operations are performed, the time in which the transactions were committed, and the particular operations performed in each of the transactions, e.g. updates, deletes, and inserts of rows. To recover from a failure, a database system re-executes the operations recorded in the redo log, bringing the database system to its pre-failure state.

Transaction transformer 120 is a computer process that rearranges the sets of database operations in a group of source transactions into other sets of database operations to produce what is referred to herein as a "reformed group of operation sets" or "reformed group." The group of source transactions are rearranged in this manner to allow their operations to be replicated using a higher degree of parallelism than might have been achieved by simply re-executing the group of source transactions on replicate database system 140.

The operations identified in the reformed group of operation sets are applied by apply processes 130 to replicate database system 140, which may serve as a logical standby of source database system 101. Each of apply processes 130 execute a transaction, in parallel with other apply processes, on replicate database system 140.

Reformed Data Groups

When transaction transformer 120 rearranges transactions, it generates reformed group data 124, which defines reformed groups created by transaction transformer 120. FIGS. 2A and 2B are diagrams that show database operations of a group of source transactions and their re-arrangement into a reformed group of operation sets.

Referring to FIG. 2A, it shows a group of source transactions 201, which include transactions $T^1$ and $T^2$. $T^1$ is committed before $T^2$ on source database system 101; $T^1$ and $T^2$ are contiguous in time, that is, no transaction on source database system 101 was committed between them.

Each of transactions $T^1$ and $T^2$ includes a set of database operations. $T_1$ includes database operations $^1R_1$, $^1R_2$, $^1R_3$, $^1R_4$, $^1R_5$, and $^1R_6$. $T^2$ includes $^2R_2$, $^2R_7$, $^2R_8$, $^2R_9$, and $^2R_1$. In this description, a notation is used to refer to an operation. Specifically, a superscript prefix refers to the number of the transaction to which an operation belongs and a subscript suffix refers to the row-id being updated by the operation. The operation $^1R_1$ belongs to transaction $T^1$ and modifies row 1. Likewise, $^1R_2$, $^1R_3$, $^1R_4$, $^1R_5$, and $^1R_6$ belong to transaction $T^1$ and modify rows 2, 3, 4, 5, and 6, respectively; $^2R_2$, $^2R_7$, $^2R_8$, $^2R_9$, and $^2R_1$ belong to transaction $T^2$ and modify rows 2, 7, 8, 9, and 1, respectively.

Referring to FIG. 2B, reformed group of operation sets 220 are depicted in table form with lines and columns. The columns correspond to an operation set. Reformed group of operation sets 220 includes six operation sets 221, 222, 223, 224, 225, and 226. Operation set 221 includes $^1R_1$, $^2R_7$, and $^2R_1$. Operation set 222 includes $^1R_2$, $^2R_2$, and $^2R_8$. Operation set 223 includes $^1R_3$ and $^2R_9$. Operation set 224 includes $^1R_4$. Operation set 225 includes $^1R_5$. Operation set 226 includes $^1R_6$.

When transactions $T^1$ and $T^2$ are replicated on, for example, a logical standby using conventional replication techniques, the transactions cannot be simply be re-executed in parallel because they modify the same records. For example, both operations $^1R_2$ in T1 and $^2R_2$ in T2 modify row 2.

Reformed group of operations sets 220 and transactions $T^1$ and $T^2$ contain the same database operations, but group them differently. The operations from $T^1$ and $T^2$ affecting a particular row are grouped together in the same set within reformed group of operations sets 220—no set within the reformed group includes a modification to the same row. For example, the only operations affecting row 2 are $^1R_2$ and $^2R_2$, which both belong to operation set 221.

The rows that contain $^1R_2$ and $^2R_2$ indicate the relative order of their commit times. $^1R_2$, being in the first row, was committed before $^2R_2$, which is in the second row.

State Consistency

A state, as used herein, refers to values in a database (or any set of data updated through transaction processing) that exist when a particular transaction is committed. Thus, separate states exist when $T^1$ is committed and when $T^2$ is committed.

To replicate transactions $T^1$ and $T^2$ on replicate database system 140, reformed group of operation sets 220 are executed in parallel in transactions in a manner that leaves replicate database system 140 in a state that is consistent with the state of the source database system 101 at the end of transaction $T_2$. This is achieved, at least in part, by executing operations sets 221, 222, 223, 224, 225 and 226 in separate but parallel apply transactions, using the following approach.

(1) Operations in a group of source transactions that affect the same row should be executed in an apply transaction in the same relative order they were applied in the group transaction. The order should account for the commit time of the source transactions. For example, $^1R_1$ should be executed before $^2R_1$ because the commit time of $T^1$ is before $T^2$. If an operation affecting the same rows is executed in the same source transaction, the relative order of execution within the apply transaction should be same as the relative order of execution in the source transaction.

(2) The apply transactions are group committed, that is, they are all committed or none of them are committed.

The order of operations depicted in reformed group data 124 reflects the order in which they will be executed in an apply transaction. For example, operation $^1R_2$ should be executed in an apply transaction before $^2R_2$. When the apply transaction for operation set 232 is committed, the value of row 2 will be as modified by $^2R_2$, the last operation executed in the apply transaction. This leaves row 2 in replicate database system 140 in a state that is consistent with row 2 in source database system 101 at the commit time of $T^2$.

Note that $^2R_7$ and $^2R_8$ are an example of a first operation 211 and a second operation from 212 from one transaction that are executed within separate transactions that are applied at a logical standby. Note also $^1R_1$ and $^2R_1$ are an example of a third operation 213 from a first transaction and a second operation 214 from a second transaction, where the third operation and the fourth operation are executed within one transaction that is applied at a logical standby.

It should be noted that, under this approach, for a group of source transactions replicated on replicate database system 140, not every state that existed after committing each of the source transactions on the source database system will have existed on the replicate database system 140. For example, after reformed group of operations is committed on source database system 101, the state that existed on source database system 101 after committing $T^2$ exists on replicate database system 140, but the state that existed on source database system 101 after committing $T^1$ will never have existed on replicate database system 140. Thus, all states that existed on replicate database system 140 are consistent with those on source database system 101, but not all states that existed on source database system 101 will have been replicated on replicate database system 140. This does not cause any discrepancy for reporting applications running on a logical standby, as these applications only see the data after a group transaction commits.

Reformed groups of operation sets enable parallelism to be increased in several ways when replicating a group of source transactions. First, rather than re-executing a group of transactions on the replicate database system, the operations of the group may instead be executed by a larger number of apply transactions. Second, a group of source transactions that contain source operations that not be re-executed in parallel is rearranged into sets of transactions that can be executed in parallel and in any order relative to each other.

Buckets and Bucket List Groups

Figure 3:
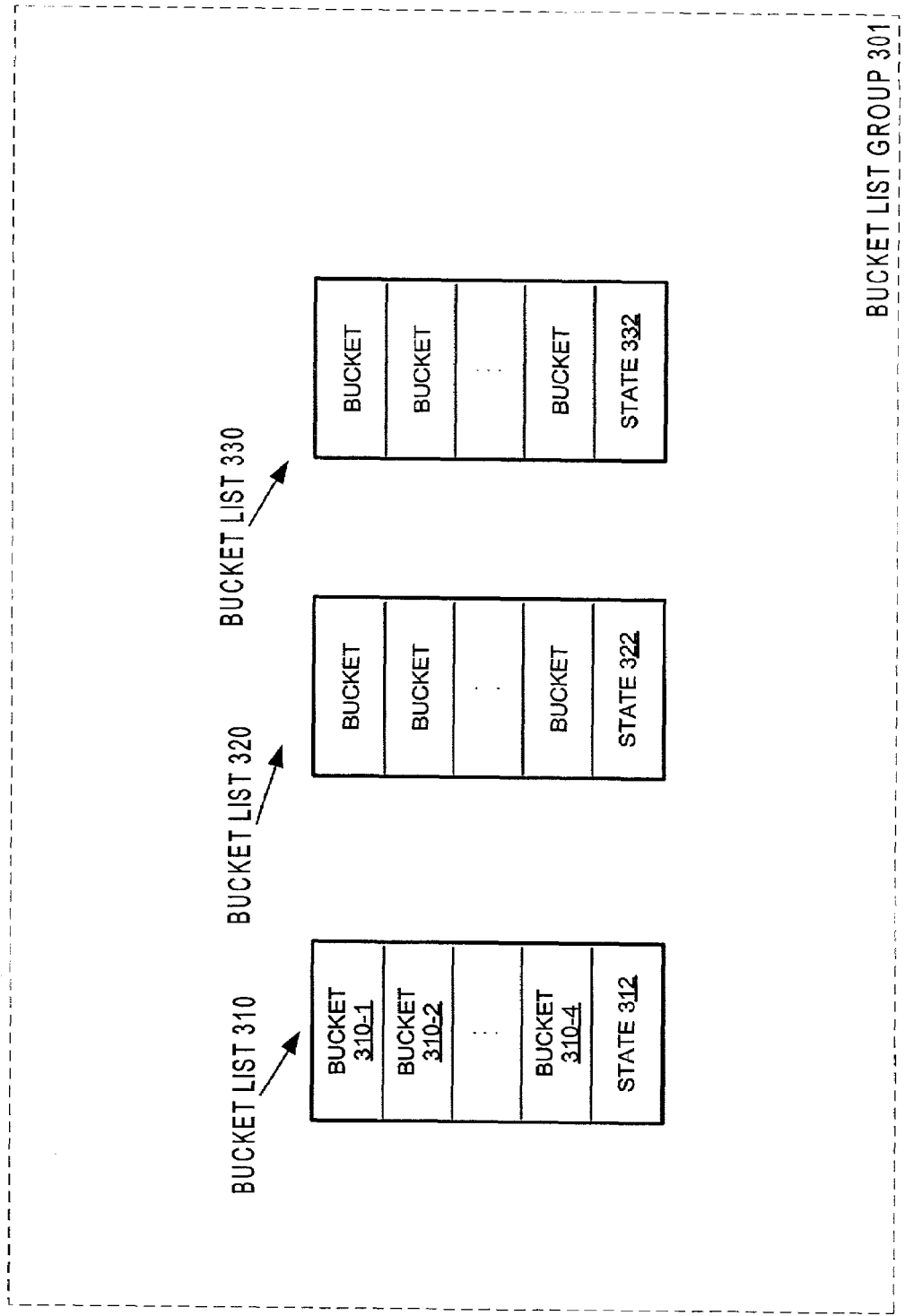
FIG. 3 is a block diagram depicting buckets used to organize the operations in a set of transactions to replicate according to an embodiment of the present invention.

FIG. 3 is a block diagram depicting buckets used to implement a transaction rearrangement process that re-arranges source transactions dynamically. The buckets define operation sets that are executed by a corresponding apply process in an apply transaction.

Referring to FIG. 3, bucket list group 301 includes bucket lists 310, 320, and 330. A bucket list contains multiple buckets, each bucket defines one or more operations that are executed by an apply process in an apply transaction. When an apply process executes the operations of a bucket in an apply transaction, the apply process is referred to herein as executing a bucket.

The buckets in a bucket list together specify the complete set of operations executed in a group of source transactions that are "contiguous in time". Specifically, each group of source transactions contains one or more consecutively committed source transactions committed on source database system 101. Each group of source transactions correspond to a period of time and contains all the transactions committed during the period on the source database system that affect replicate database system 140.

The groups of source transactions that correspond to the bucket lists of bucket group 301 are also contiguous in time. Bucket list 310 corresponds to the group of source transactions committed before and adjacent in time to the group of source transactions that corresponds to bucket list 320. Likewise, bucket list 320 corresponds to the group of source transactions committed before and adjacent in time to the group of source transactions that corresponds to bucket list 330. Thus, an order is associated with bucket lists 310, 320, and 330 that is based on the commit times of their respective groups of source transactions. This order is herein referred to as the bucket list order.

All operations in a group of source transactions that affect a particular record in the source database system are contained in one bucket. For the operations in a bucket that affect a particular record, the bucket defines the order the operations are executed. The order is based on the commit time of the operation's respective transaction. If operations to the same row belong to the same source transaction, the order defined by the bucket reflects the relative order of the operations in the source transaction.

For a given bucket list, its buckets may be executed by apply processes in parallel in an order independent of the order of execution of the other buckets in the same bucket list. Preferably, the number of buckets in a bucket list is equal to twice the number of apply processes. In addition, the buckets may be generated so that they each define an approximately equal number of operations, and, consequently, an approximately equal work load. In general, the efficiency of executing a task in parallel is improved when the worked load is distributed equally between the processes executing the task in parallel.

When apply processes 130 execute the buckets of a bucket list, each bucket is executed as part of an apply transaction in a group of apply transactions. When all buckets have been executed, the group of transactions are group committed.

While the buckets within a single bucket list may be executed in any order, the bucket lists themselves are executed serially based on their bucket list order. Apply processes 130 do not commence execution of a bucket list until the apply transactions of the previous bucket list are group committed.

Bucket lists are generated dynamically by transaction transformer 120. Apply processes 130 may not commence execution of a bucket list until transaction transformer 120 completes formation of a bucket. To indicate when execution of a bucket list may be commenced, bucket lists 310, 320, and 330 each contain an element referred to herein as a list state. Bucket lists 310, 320, and 330 contain list states 312, 322, and 332, respectively.

A list state may be set to various values that indicate various aspects related to the processing of bucket lists. The 'INCOMPLETE' state indicates that the bucket list is in the process of being formed by transaction transformer 120. The 'READY' state indicates that a bucket list may be executed by apply processes 130. The 'COMPLETE' state indicates that the processing of a bucket list has been completed by apply processes 130 and the corresponding batch of transactions have been group committed.

Forming Bucket Lists

Figure 4:
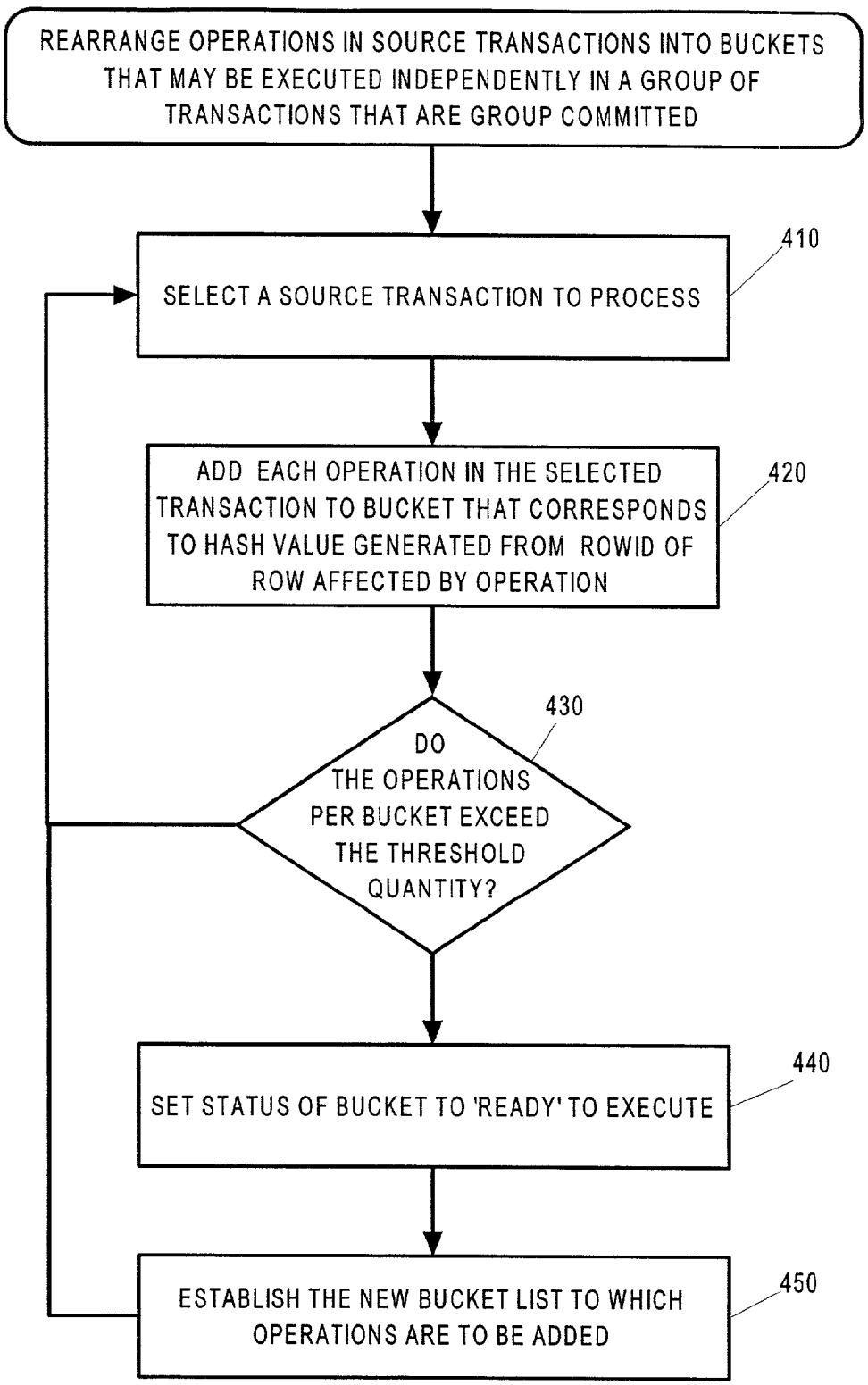
FIG. 4 is a flowchart depicting a process for rearranging the operations of a set of transactions so that they may be executed more efficiently by another set of transactions.

FIG. 4 shows a flowchart depicting the steps of a process for dynamically forming bucket lists according to an embodiment of the present invention. The bucket list being formed is referred to herein as the current bucket list. The steps are illustrated using the various components described in FIGS. 1 and 3.

Referring to FIG. 4, at step 410, transaction transformer 120 selects a source transaction that has been committed on source database system 101. Source log 110 is examined to select a source transaction. The source transactions are selected in an order based on their relative commit times.

At step 420, transaction transformer 120 adds each operation in the selected transaction to the bucket that corresponds to a hash value generated from the row-id of the row affected by an operation. As a result, all operations in the current transaction affecting a particular row are added to the same bucket.

At step 430, transaction transformer 120 determines whether the number of operations defined per bucket exceed a threshold quantity. This may be determined by dividing the total of number of operations assigned for the current bucket list by the number of buckets in the current list of buckets.

The accuracy of determining the number of transactions in this manner may be improved when the number of operations assigned to buckets is uniform. For this reason, it is preferable that the values produced by applying the hash function in step 420 occur with uniform frequency. Under these conditions, each bucket should have about the threshold quantity of operations, and workload should be distributed evenly among the apply processes.

If transaction transformer 120 determines that the number of operations defined per bucket is not at least as great as a threshold quantity, then execution of the steps proceeds to step 410. Otherwise, execution proceeds to step 440.

At step 440, the status of the bucket is set to 'READY'.

At step 450, transaction transformer 120 establishes a new bucket list as the current bucket list.

Executing Bucket Lists

Figure 5:
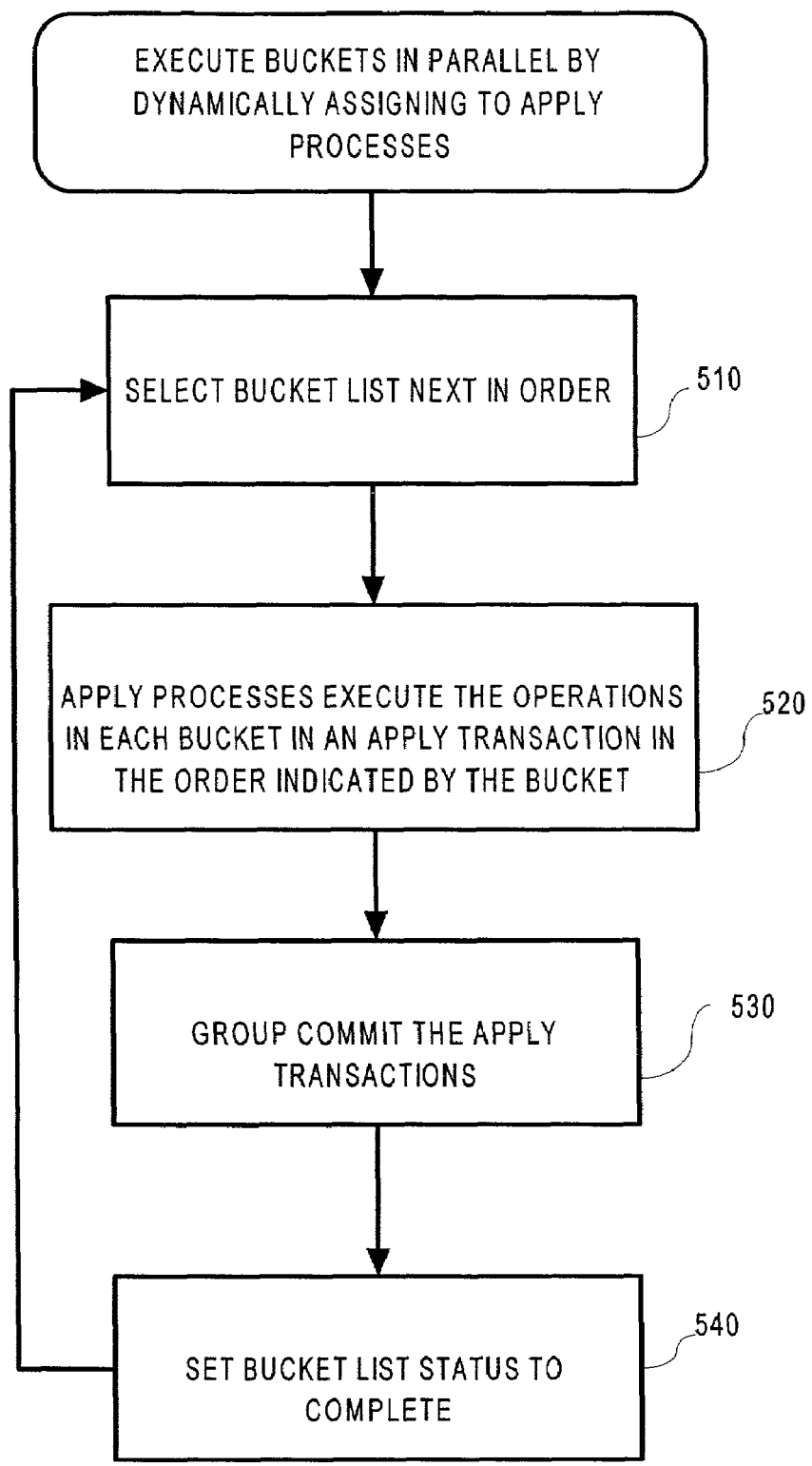
FIG. 5 is a flowchart depicting a process for dynamically executing such rearranged operations according to an embodiment of the present invention.

FIG. 5 is a flowchart depicting an overview of a process where the apply processes execute buckets of a bucket list. The bucket list being executed is referred to herein as the current bucket list.

At step 510, the bucket list next in the bucket order is selected. To be selected, the bucket list state should be set to 'READY'.

At step 520, the apply processes execute the operations in each bucket in an apply transaction, in the order indicated by the bucket. Each apply process executes buckets in a different apply transaction. For example, an apply process may execute buckets $b_1$ and $b_2$ as a transaction TT.

At step 530, the group of transactions executed by the apply processes for the current bucket list are committed as a group.

At step 540, the state of the bucket list is set to 'COMPLETE'.

Hardware Overview

Figure 6:
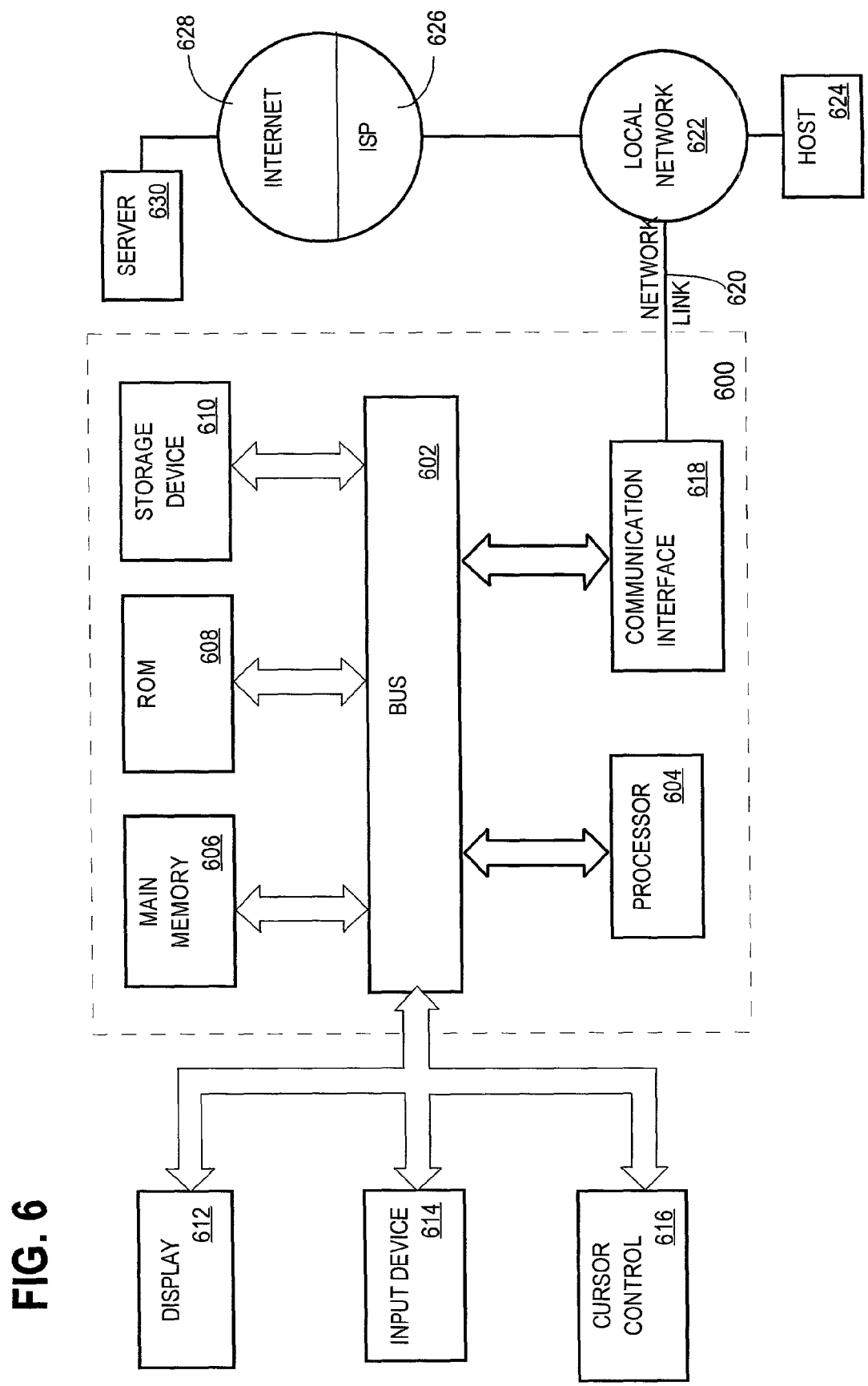
FIG. 6 is a flowchart depicting a computer system which may be used to implement an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for replicating operations of transactions, the method comprising the steps of:
arranging a plurality of operations in a first plurality of transactions into groups of operations;
executing each group of said groups of operations in a particular transaction of a second plurality of transactions;
wherein each group of said groups is executed independently of when any other group from said groups of operations is executed;
wherein said plurality of operations include a first operation and a second operation in one transaction of said first plurality of transactions;
wherein a transaction of said second plurality of transactions includes said first operation but does not include said second operation;
wherein a transaction of said second plurality of transactions includes said second operation but does not include said first operation; and
after executing the second plurality of transactions, causing all of said second plurality of transactions to be committed as a group.

2. The method of claim 1, wherein:
each operation of said plurality of operations modifies a record of a plurality of records; and
the step of arranging includes arranging said plurality of operations into groups so that, for each record of said plurality of records modified by two or more operations of said plurality of operations, the two or more operations belong to the same group of operations.

3. The method of claim 2, wherein the step of executing each group of said groups of operations includes causing said two or more operations to be executed in the same relative order that said two or more operations were executed in within said first plurality of transactions.

4. The method of claim 2, wherein the step of executing each group of said groups of operations includes causing said two or more operations to be executed in the same relative order of commit times of the respective transactions of said two or more operations.

5. The method of claim 1, wherein:
the first plurality of transactions includes a first transaction and a second transaction;
said first transaction includes a third operation and said second transaction includes a fourth operation in said second transaction; and
the step of arranging a plurality of operations includes assigning said third operation and said fourth operation to a first group of said groups of operations.

6. The method of claim 5, wherein:
the first transaction and the second transaction are associated with a commit time; and
wherein the commit time of the first transaction is before the commit time of the second transaction.

7. The method of claim 1, wherein the step of executing each group of said groups of operations includes executing each group in an order independent of the order in which any other group from said groups of operations is executed.

8. The method of claim 1, wherein the step of executing each group of said groups of operations includes executing at least one transaction of said second plurality of transactions in parallel with at least one other transaction of said second plurality of transactions.

9. The method of claim 1, wherein:
the first plurality of transactions has a first number of transactions; and
wherein the step of arranging a plurality of operations includes arranging said plurality of operations into a number of groups that is greater than said first number.

10. The method of claim 1, wherein the step of arranging a plurality of operations in a first plurality of transactions into groups of operations includes examining a source log of a first database system to determine the operations in said first plurality of transactions.

11. The method of claim 1, wherein the first plurality of transactions is executed on a first database system and the second plurality of transactions are executed on a second database system used to replicate data on said first database system.

12. A computer-readable medium carrying one or more sequences of instructions for replicating operations of transactions, wherein execution of the one or more sequences of instructions by one or more processors causes the one or more processors to perform the steps of:
arranging a plurality of operations in a first plurality of transactions into groups of operations;
executing each group of said groups of operations in a particular transaction of a second plurality of transactions;
wherein each group of said groups is executed independently of when any other group from said groups of operations is executed;

wherein said plurality of operations include a first operation and a second operation in one transaction of said first plurality of transactions;

wherein a transaction of said second plurality of transactions includes said first operation but does not include said second operation;

wherein a transaction of said second plurality of transactions includes said second operation but does not include said first operation; and after executing the second plurality of transactions, causing all of said second plurality of transactions to be committed as a group.

13. The computer-readable medium of claim 12, wherein:

each operation of said plurality of operations modifies a record of a plurality of records; and the step of arranging includes arranging said plurality of operations into groups so that, for each record of said plurality of records modified by two or more operations of said plurality of operations, the two or more operations belong to the same group of operations.

14. The computer-readable medium of claim 13, wherein the step of executing each group of said groups of operations includes causing said two or more operations to be executed in the same relative order that said two or more operations were executed in within said first plurality of transactions.

15. The computer-readable medium of claim 13, wherein the step of executing each group of said groups of operations includes causing said two or more operations to be executed in the same relative order of commit times of the respective transactions of said two or more operations.

16. The computer-readable medium of claim 12, wherein:

the first plurality of transactions includes a first transaction and a second transaction;

said first transaction includes a third operation and said second transaction includes a fourth operation in said second transaction; and the step of arranging a plurality of operations includes assigning said third operation and said fourth operation to a first group of said groups of operations.

17. The computer-readable medium of claim 16, wherein:

the first transaction and the second transaction are associated with a commit time; and wherein the commit time of the first transaction is before the commit time of the second transaction.

18. The computer-readable medium of claim 12, wherein the step of executing each group of said groups of operations includes executing each group in an order independent of the order in which any other group from said groups of operations is executed.

19. The computer-readable medium of claim 12, wherein the step of executing each group of said groups of operations includes executing at least one transaction of said second plurality of transactions in parallel with at least one other transaction of said second plurality of transactions.

20. The computer-readable medium of claim 12, wherein:

the first plurality of transactions has a first number of transactions; and wherein the step of arranging a plurality of operations includes arranging said plurality of operations into a number of groups that is greater than said first number.

21. The computer-readable medium of claim 12, wherein the step of arranging a plurality of operations in a first plurality of transactions into groups of operations includes examining a source log of a first database system to determine the operations in said first plurality of transactions.

22. The computer-readable medium of claim 12, wherein the first plurality of transactions is executed on a first database system and the second plurality of transactions are executed on a second database system used to replicate data on said first database system.

* * * * *

UNITED STATES PATENT AND TRADEMARK OFFICE
CERTIFICATE OF CORRECTION

PATENT NO. : 7,406,486 B1
APPLICATION NO. : 10/120634
DATED : July 29, 2008
INVENTOR(S) : Kundu et al.

It is certified that error appears in the above-identified patent and that said Letters Patent is hereby corrected as shown below:

In column 3, line 61, delete "$T_1$" and insert -- $T^1$ --, therefor.

In column 3, line 61, delete "$R_3$," and insert -- $^1R_3$, --, therefor.

In column 4, line 18, delete "T1" and insert -- $T^1$ --, therefor.

In column 4, line 18, delete "T2" and insert -- $T^2$ --, therefor.

In column 4, line 43, delete "$T_2$." and insert -- $T^2$.--, therefor.

Signed and Sealed this

Fifteenth Day of December, 2009

David J. Kappos
*Director of the United States Patent and Trademark Office*